United States Patent [19]

Yamazaki et al.

[11] Patent Number: 4,854,518
[45] Date of Patent: Aug. 8, 1989

[54] HUB SETTING DEVICE

[75] Inventors: Tsuneo Yamazaki; Tomoki Saito; Hideo Ayabe, all of Kanagawa, Japan

[73] Assignee: Fuji Photo Film Co., Ltd., Kanagawa, Japan

[21] Appl. No.: 213,561

[22] Filed: Jun. 30, 1988

[30] Foreign Application Priority Data

Jul. 3, 1987 [JP] Japan .................. 62-165514

[51] Int. Cl.⁴ ........................................... B65H 75/18
[52] U.S. Cl. .................................. 242/56.9; 242/72 R
[58] Field of Search ................ 242/68.2, 72 R, 72 B, 242/56.9, 46.4; 279/2 A, 2 R

[56] References Cited

U.S. PATENT DOCUMENTS

| | | | |
|---|---|---|---|
| 3,073,610 | 1/1963 | MacKinder et al. | 242/72 X |
| 3,917,187 | 11/1975 | Damour | 242/72 B |
| 3,937,412 | 2/1976 | Damour | 242/72 B |
| 4,114,909 | 9/1978 | Taitel et al. | 279/2 A X |
| 4,124,173 | 11/1978 | Damour | 242/72 B |
| 4,220,291 | 9/1980 | Papa | 242/56.9 |

*Primary Examiner*—David Werner
*Attorney, Agent, or Firm*—Sughrue, Mion, Zinn, Macpeak & Seas

[57] ABSTRACT

A hub setting device for a hub onto which a magnetic tape is wound with which the hub can easily be attached to and removed from a rotary shaft with substantially no play between the hub and shaft when engaged. A divided ring is retained in a recess formed in a boss portion of the shaft, and the ring is urged radially outwardly by an elastic member such as a pair of elastic tubular members. An elastic retention member is fitted around the divided ring, received completely within a recess formed around the outer circumferential surface of the ring.

5 Claims, 3 Drawing Sheets

HUB SETTING DEVICE

BACKGROUND OF THE INVENTION

The present invention generally relates to an apparatus for producing a magnetic tape, and more particularly relates to a device for setting a hub for taking up thereon a magnetic tape which is cut in a predetermined tape width from an original roll of wide magnetic tape.

Recently, magnetic tape has been widely used as a magnetic recording medium in various fields as the performance of magnetic tape has been improved.

Generally, magnetic tape is manufactured by first producing an original roll of tape which is much wider than the rolls of tape to be actually sold. The original roll of magnetic tape is then cut into tapes of a predetermined width in a slitting step. In the slitting step, as shown in FIG. 1, a magnetic tape $T_o$ is cut into a plurality of magnetic tapes $T_n$ with a cutter 20, and the cut tapes are wound at a high speed onto hubs 8, which are provided in a number corresponding to the number of cut tapes. Although not illustrated in FIG. 3, generally, the cut tapes Tn are subjected to further processing such as finishing at the tape edges (cut surfaces), cleaning at the front and rear surfaces, and the like.

Each of the hubs 8 onto which the magnetic tapes $T_n$ are to be wound are removably attached to a boss member 14 of a rotary shaft 7. It is very important, in view of productivity, to make it possible to easily attach/remove the hub 8 onto/from the boss member 14 before the start and after the completion of the slitting step, and it is also very important, in view of maintaining the tape in good condition, to make it possible to surely attach the hub 8 onto the boss member 14 in such a manner that the hub has no play on the boss member. To this end, there have been proposed various devices.

FIG. 2 shows the basic structure of a conventional hub setting device. As shown in FIG. 2, the hub 8 is fitted on the boss member 14 suitably fixed on the rotary shaft 7. Two grooves are circumferentially formed in an outer circumferential surface 16 of the boss member 14, and in the respective grooves, 0-rings 17 made of, for example, NBR (acrylonitrile-butadiene rubber) and coil springs 18 are provided, the 0-rings 17 covering the upper portions of the respective 0-rings 17. The coil springs 18 are arranged so as to suitably project from the outer circumferential surface 16 of the boss member 14.

The hub 8 is inserted onto the thus-arranged boss member 14 in such a manner that an inner circumferential surface 9 of the hub 8 comes into contact with the coil springs 18 and the 0-rings 17 and the coil springs 18 are suitably deformed while being rotated corresponding to the direction of hub insertion (the direction shown by an arrow A) as shown in FIG. 3. The thus-inserted hub 8 is retained due to abutment between the coil springs 18 and the inner circumferential surface 9 (mainly due to the abutment caused by the elasticity of the 0-rings 17).

However, because the 0-rings 17 and the coil springs 18 have considerable variations in diameter and the hub is in line contact (strictly, point contact) with the coil springs 18, the hub cannot be retained securely unless the coil springs 18 are urged against the inner circumferential surface 9 with a considerably large force. However, if this force is too large, the coil springs 18 can easily be worn by the repetitive attachment/removal of the hub. It is therefore difficult to ensure stable retention of the hub over long periods. Further, from a viewpoint of hub insertion, it is desirable to provide a suitable clearance $t_1$ relative to the groove width $l_1$ so that each coil spring 18 can be rotated easily, while from a viewpoint of hub retention, the clearance $t_1$ is not desirable because the clearance allows play of the hub 8 on the boss member, causing deviations in the rotation of the hub, and thereby causing the attitude of the wound tape to be poor or causing microscopic chipping of the hub due to the friction between the inner circumferential surface 9 and the coil springs 18.

If the winding attitude of the magnetic tape $T_n$ wound on the hub 8 is poor, not only is the appearance of the tape not good, but the movement of the tape may be poor in a post-winding step such as a rewinding step in which the magnetic tape $T_n$ is wound onto the reel of a magnetic tape cassette, resulting in undesirable tape condition, for example, damage to the cut edges the tape. There is a further problem that chips of the hub material adhere to the magnetic tape $T_n$, thus significantly lowering the tape quality.

A variety of boss member structures other than that shown in FIG. 2 have been proposed. However, they are substantially the same as that shown in FIG. 2, and the above problems have not been eliminated yet.

SUMMARY OF THE INVENTION

The present invention has been attained in view of the above-mentioned various problems, and it is an object of the present invention to provide a hub setting device in which a hub can be attached/removed easily to make the productivity of the tape manufacturing process good, and with which the hub can be surely retained so that the tape quality is not lowered.

The above and other objects of the present invention are achieved by a device for setting a hub around which a magnetic tape is to be wound, the hub setting device being provided with a boss member which engages with an inner circumferential surface of the hub so as to transmit the driving force of a rotary shaft to the hub, in which a recess portion is formed in an outer circumferential surface of the boss member and a divided ring is retained in the recess portion and urged toward the hub by elastic members so that an outer surface of the divided ring and an inner surface of the hub are in face-to-face contact with each other.

DESCRIPTION OF THE PREFERRED EMBODIMENTS

Figure 1:
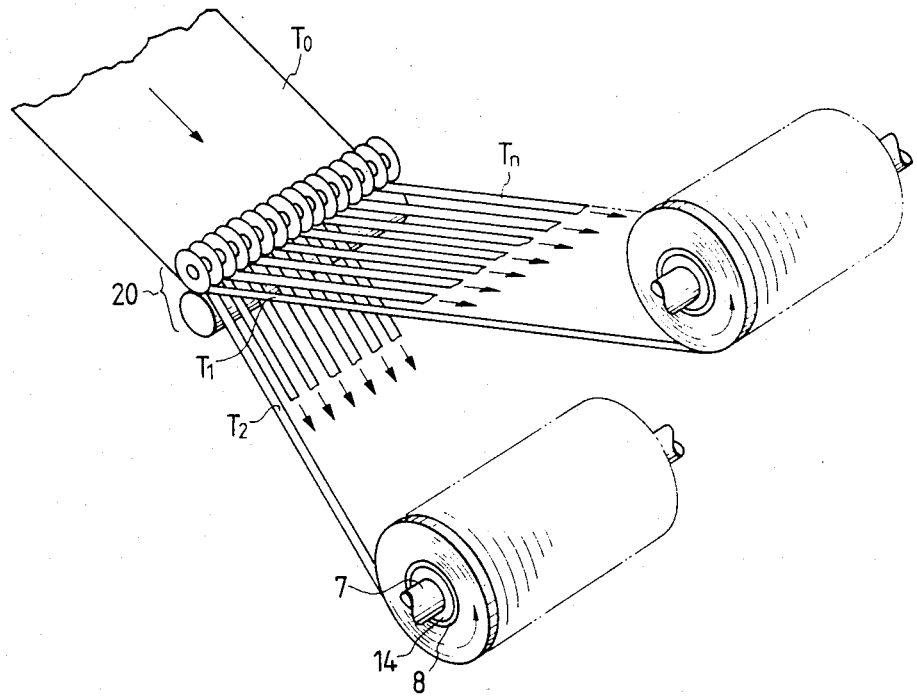
FIG. 1 is a schematic perspective view showing a conventional tape slitting step.
Figure 2:
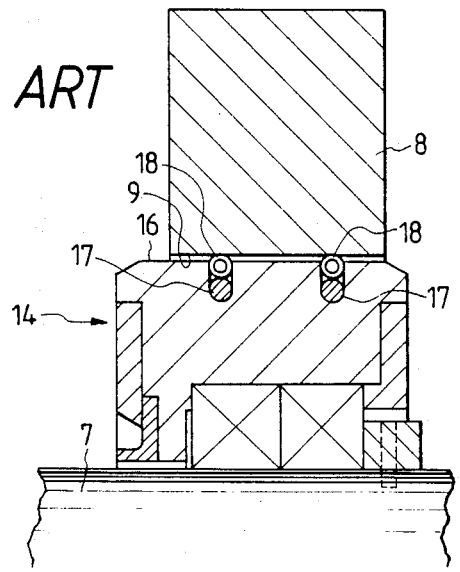
FIG. 2 is a schematic cross section of a conventional boss member.
Figure 3:
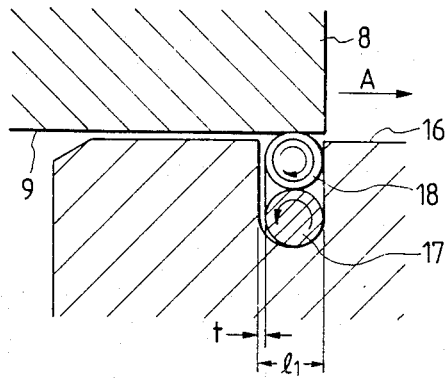
FIG. 3 is an enlarged view of a part of FIG. 2.

Referring to the drawings, a detailed description of preferred embodiments according to the present invention will be given.

Figure 4:
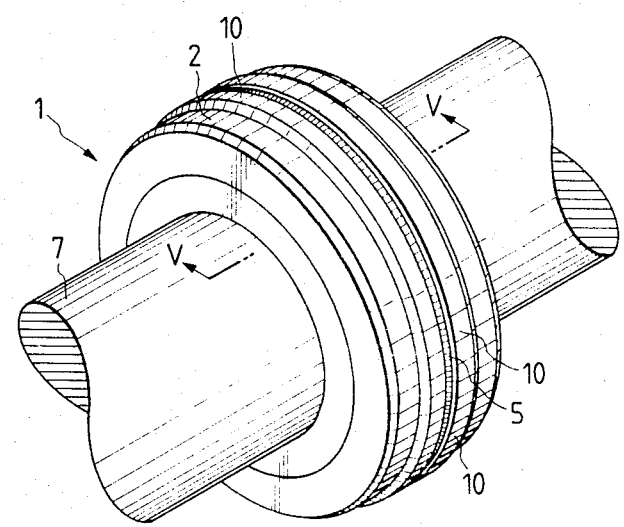
FIG. 4 is a perspective view showing a main portion of a preferred embodiment of a hub setting device constructed according to the present invention.
Figure 5:
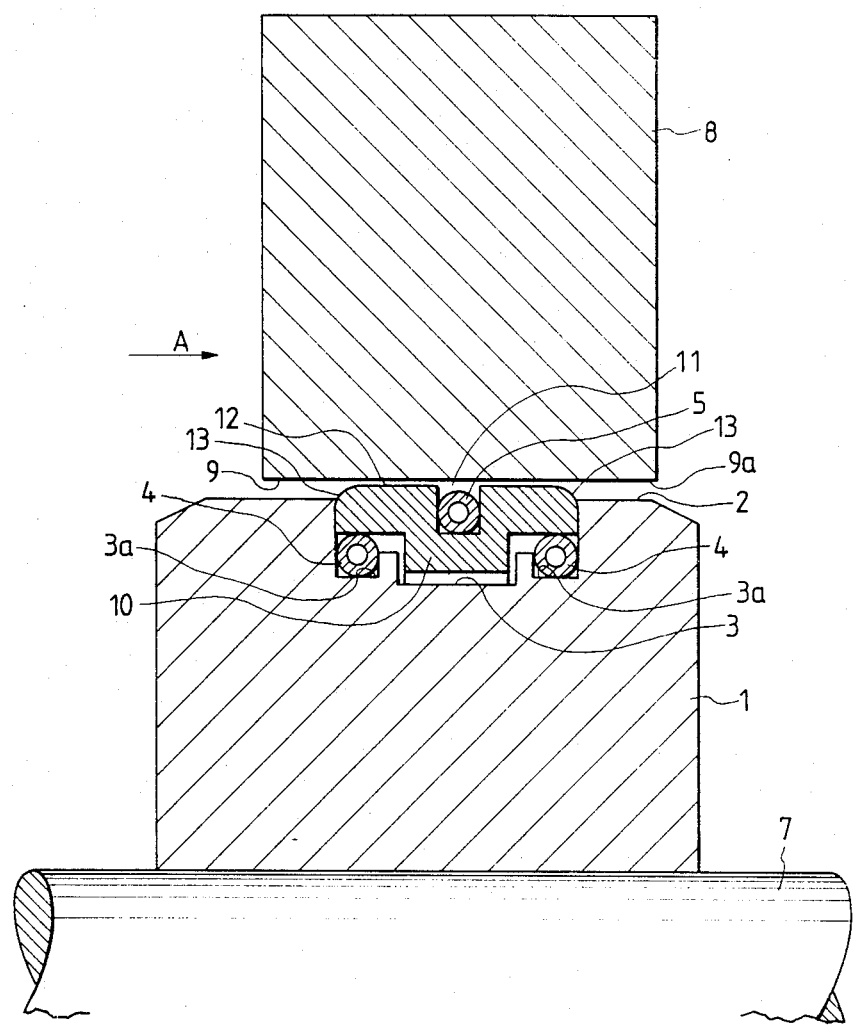
FIG. 5 is a cross section taken on a line V—V in FIG. 1.

FIG. 4 is a perspective view of a hub setting device constructed according to the present invention, and FIG. 5 is a cross section taken on a line V—V in FIG. 4.

A boss member 1 shown in FIGS. 4 and 5 is arranged to suitably engage a rotary shaft 7 so as to rotate similarly to the conventional boss member 14. A recess portion 3 is circumferentially formed in the center of the outer circumferential surface of the boss member 1, with a width of, for example, about one-third that of the boss member 1. Elastic members 4 are provided under positional restriction in receiving grooves 3a formed at the right and left ends of the recess portion 3. A divided ring 10 is provided over the elastic members 4, and a retention member 5 is provided around the outer circumference of the divided ring 10 so as to prevent the divided ring 10 from coming out of the recess portion 3.

The divided ring 10 has a plate-like shape with an arcuate engagement surface 12 which comes into face-to-face contact with an inner circumferential surface 9 of the hub 8. The divided ring 10 is restricted in movement in the direction of the ring's width by the side surfaces of the recess portion 3. In the embodiment illustrated in FIG. 4, the divided ring 10 is arranged so as to make a circuit around the circumference of the recess portion 3, with the divided ring 10 being divided into four parts. A groove 11 is formed in the engagement surface 12 of the divided ring 10 at its longitudinally central portion so as to receive the retention member 5 therein. Ring edge portions 13 of the retention ring 5 in the longitudinally opposite ends thereof are formed as curved surfaces with a suitable curvature.

Although the material of the divided ring 10 is not specifically limited, the divided ring 10 may be made of, for example, aluminum or the like, and it may be subjected to processing such as hard plating or the like so as to prevent the ring from being scratched.

Although conventional 0-rings may be used as the above-mentioned elastic members 4, alternatively, it is possible to use hollow tubular members, for example, silicon tubes SR-No. 1 produced by Shinetsu Polymer Co., Ltd. The silicon tubes need not always be endless 0-rings. Having a hollow structure, the silicon tubes are superior in their quantity of deformation and in elasticity, and hence in their action of urging the divided ring 10 outward from the boss member.

The retention member 5 is not specifically limited and other devices, for example, a coil spring, an 0-ring, or the like may be used so long as it has suitable elasticity. The retention member 5 is provided in a state where it is completely received in the groove 11, that is, it should not project out of the engagement surface 12 of the divided ring 10. It is preferable that the urging force of the retention member 5 pressing against the divided ring 10 not be too strong to prevent the latter from being suitably moved in the radial direction of the boss member 1 by the elasticity of the elastic member 4.

When the hub 8 is inserted onto the thus-arranged boss member 1 (in the direction of an arrow A), an inner edge portion 9a of the hub 8 comes into contact with the ring-edge portion 13 of the divided ring 10. At the time of contact, the inner edge portion 9a is prevented from being caught by the ring-edge portion 13 because the ring-edge portion 13 is curved so that the divided ring 10 is pressed smoothly into the recess portion 3. Thus, the attachment of the hub 8 can very easily be carried out. Moreover, the mounted hub 8 is very surely retained on the boss member 1, the accurate rotation of the hub 8 is ensured, and deviations in rotation are prevented because the engagement surface 12 of the divided ring 10, which is recessed outward from the boss member by the elastic members 4, engages the inner circumferential surface 9 over a wide engagement area and the position of the divided ring 10 is surely restricted in the recess portion 3 with no play. That is, since no coil springs 18 are in line contact with the inner circumferential surface 9 of the hub 8 as in the conventional arrangement, it is possible to avoid the above-discussed problems in the prior art, namely, generation of chips caused by rubbing between the inner circumferential surface 9 and the coil springs 18 due to play of the hub during attachment/removal of the hub or during rotation of the hub, deterioration in the hub retention force due to abrasion of the coil springs 18, etc.

The present invention is not limited to the embodiment described above, and may be modified in various ways, for example, in the shape and number of divided rings 10, in the shape of the recess portion 3, in the use of other elastic members, etc.

As described above, the hub setting device according to the present invention is arranged so that the plate-like divided ring member acting elastically in the radial direction of the boss member and accurately restricted in position in the outer circumferential surface of the boss member is in contact over a wide area with the inner circumferential surface of the hub around which magnetic tape is to be wound. The hub is therefore surely retained without play, and deviations in the rotational movement of the hub are suppressed, making it possible to carry out winding of the tape with accurately registered tape edges. Further, the circumferential edge portions of the divided ring are formed as curved surfaces, and at least portions of the divided ring which contact the hub are hard-plated so that the hub insertion property is improved and the abrasion of the hub retaining surface (engagement surface) is prevented, thereby suppressing the generation of chips and ensuring good retention of the hub over long periods.

What is claimed is:

1. A device for setting a hub around which a magnetic tape is to be wound, comprising: a boss member which engages an inner circumferential surface of said hub so as to transmit driving force of a rotary shaft to said hub, a recess portion being formed in an outer circumferential surface of said boss member; at least one elastic member; and a divided ring retained in said recess portion and urged toward said hub by said at least one elastic member so that an outer surface of said divided ring and an inner surface of said hub are in face-to-face contact with each other, wherein said at least one elastic member comprises a pair of rubber tube arranged so as to support said divided ring at its lower widthwise opposite ends.

2. The hub setting device according to claim 1, wherein ring edges of said divided ring along an inner circumferential direction of said boss member are curved surfaces, and at least a part of said divided ring which comes into contact with said inner circumferential surface of said hub is treated with hard plating.

3. The hub setting device according to claim 1, further comprising a retention member disposed around said divided ring.

4. The hub setting device according to claim 3, wherein groove is formed around an outer circumference of said divided ring, ad said retention member is received entirely within said groove.

5. The hub setting device of claim 4, wherein said retention member comprises a rubber tube.

* * * * *